3,431,976
POLYMER SUSPENSION AND PRODUCTION
OF OIL THEREWITH
Robert R. Harvey and Mike M. Vaclaw, Bartlesville,
Okla., assignors to Phillips Petroleum Company, a corporation of Delaware
No Drawing. Filed Oct. 2, 1967, Ser. No. 671,931
U.S. Cl. 166—274                    10 Claims
Int. Cl. E21b 43/20; C09k 3/00

ABSTRACT OF THE DISCLOSURE

A stable aqueous suspension of a polymer of an olefin of 2 to 6 carbon atoms is made by dispersing polymer particles of a size in the range of 0.001 to 2 microns in a concentration in the range of 0.001 to 5 wt. percent of the suspension in water or brine with the aid of a non-ionic surfactant in solution in a concentration in the range of 0.001 to 5 wt. percent of the solution, said surfactant being a polyethylene oxide ether or thioether having at least 30 ethylene oxide units at the hydrophilic end and a single terminal hydroxyl group. An oil-displacing surfactant is added to the suspension and a slug of the resulting suspension is introduced to an oil stratum and driven thru a section thereof to produce oil therefrom. The oil-displacing surfactant is preferably a polyethylene oxide ether or thioether having from 4 to 10 ethylene oxide units at the hydrophilic end and a single terminal hydroxyl group.

---

This invention relates to a stable aqueous suspension of a polymer of an olefin of 2 to 6 carbon atoms utilizing a dispersing surfactant in maintaining the stable dispersion and to a process for producing oil from an oil stratum utilizing a slug of the aqueous suspension of polymer to drive oil into a producing well.

The production of oil by aqueous fluid drive using either water or steam as the driving fluid and surfactants in the aqueous fluid is a conventional process in the oil industry. In this type of process, the amount of surfactant required usually exceeds the concentration needed to be effective by several orders of magnitude. The reason lies in the fact that the stratum sand or rock attracts the surfactant from aqueous carrier rather rapidly. This builds up the concentration of surfactant in the immediate vicinity of the injection well, leaving the carrier liquid substantially depleted of surfactant and incapable of treating deeper parts of the stratum unless high concentrations of the surfactant are utilized.

U.S. Patent 3,326,287 issued to Myron L. Corrin, discloses a process for oil production which utilizes a suspension of minute particles of carbon black, talc, and/or kaolin in a solution of surfactant as an aqueous suspension for driving oil from an oil stratum.

This invention is concerned with another type of suspension for displacing oil from an oil stratum.

It is an object of the invention to provide a novel stable aqueous suspension of minute particles of certain polymers containing surfactants in solution to maintain the stable suspension. Another object is to provide such a suspension containing, in addition, an oil-displacing surfactant which is effective in producing oil from an oil stratum. Another object is to provide a process for displacing oil from an oil stratum utilizing the polymer suspension containing the oil-displacing surfactant. Other objects of the invention will become apparent to one skilled in the art upon consideration of the accompanying disclosure.

A broad aspect of the invention comprises a stable aqueous suspension of a polymer of a 1-olefin of 2 to 6 carbon atoms of a particle size in the range of 0.001 to 2 microns in a concentration in the range of 0.001 to 5 weight percent of the suspension using water or brine as the aqueous liquid and a non-ionic surfactant in solution in a concentration in the range of 0.001 to 5 weight percent, said surfactant being a polyethylene oxide ether or thioether having at least 30 ethylene oxide units at the hydrophilic end and a single terminal hydroxyl group. Another embodiment of the invention comprises the stable aqueous suspension of the polymer using the long-chain surfactant and also containing dissolved therein an oil-displacing surfactant. The prepared oil-displacing surfactant is a polyethylene oxide ether or thioether having from 4 to 10 ethylene oxide units at the hydrophilic end and a single terminal hydroxyl group. Any surfactant which is effective in rendering the sand or rock in the stratum water-wet is capable of displacing oil and is operable in the invention.

A slug of the stable aqueous suspension of the selected polymer or polymers containing both types of surfactant is injected into the oil stratum thru a well therein and driven thru the stratum with a suitable driving fluid such as water, steam, air, etc., to displace oil from the area of the stratum traversed by the slug and the displaced oil is produced thru a well penetrating the stratum. The slug is either driven on thru the stratum to an offset production well or the injection of driving fluid is terminated and the pressure on the injection well is substantially reduced so that the slug moves back toward the injection well, moving the displaced oil into the injection well for production therefrom by conventional means, such as pumping. When the process is applied to a single well, the injection, drive, and release of pressure steps are repeated until the procedure is no longer economical. The preferred method comprises driving the injected slug with a suitable driving fluid to one or more offset wells which may lie in a ring pattern around the injection well or in parallel lines of production wells on opposite sides of the injection well.

While a broad range of concentration of surfactant in the polymer suspension is 0.001 to 5 weight percent of the slug to be injected into the stratum, it is preferred to use a concentration in the range of 0.01 to 1.0 weight percent. While the particle size of the suspended polymer may be as high as 2 microns, it is preferred to use particles which do not exceed 1 micron in size. The amount of slug injected into the stratum is usually in the range of 0.1 to 1.0 pore volumes but lesser and greater amounts of the suspension of particulate polymer may be utilized, depending upon the pore size and pore character of the oil stratum being produced.

A number of non-ionic surface active agents or surfactants which are water soluble are readily available from commercial sources. Hydrophilic (or lyophylic) agents attracted to the water phase are most desirably employed. Exemplary non-ionic agents are those obtained by reaction of a hydrophobic hydroxy compound such as a phenol or alcohol with several moles of an alkylene oxide principally ethylene oxide or propylene oxide. Water solubility increases with the number of moles of the alkylene oxide reacted. Such reaction products from oleyl alcohol, alkylated-B-naphthol, alkyl phenol such as nonylphenol, may be mentioned as exemplary. Similarly, alkylene oxide (ethylene oxide) reaction products of higher fatty acids are well known as well as of fatty acid esters, including ethylene oxide reaction products of fatty acid esters of anhydrosorbitols. Lauric, palmitic, oleic, and stearic acids are commonly used for such esters which may generally be referred to as polyoxyalkylene derivatives of hexitol anhydride partial long chain fatty acid esters. The hexitol is usually sorbitol. Other non-ionic agents include phosphoric acid esters of polyethylene glycol; low order condensation products of alkylene oxides with esters of polyhydric alcohols and polybasic soluble acids, such as glycol tartrate and glycerol stearate further esterified with stearic acid; alkylene oxide condensation products of higher fatty acid reaction products with alkylolamines such as coconut fatty acids with diethanolamine; saponins; etc.

Not all of the non-ionic surfactants within the scope of the preceding paragraph are equivalents in the invention. Those which have an average ethylene oxide chain lengths at the hydrophilic end in the range of 4 to 10 moles (or units of ethylene oxide), and a single terminal hydroxyl group are good to excellent in displacing oil. Similar non-ionic surfactants having an average ethylene oxide chain length at the hydrophilic end in the range of 30 to 100 or even up to 150 or 200 are excellent dispersants for the particulate polymer in either fresh water or in brine containing up to 15 or 20 percent by weight of salt (principally NaCl). However, a surfactant containing more than 100 ethylene oxide units in the hydrophilic end of the molecule have no advantage over the corresponding surfactant containing only 100 ethylene oxide units. A preferred oil-displacing surfactant is Igepal CO–530 nonylphenoxypolyethanol (6 to 6.5 ethoxy groups). A preferred dispersing surfactant for the particulate polymer is Igepal CO–990, nonylphenoxypolyethanol (100 ethoxy groups).

The selected polymer is a relatively low molecular weight polyethylene, polypropylene, polybutene, polybutadiene, polypentene, polyhexene, polystyrene, or other polymer of a $C_2$–$C_6$ olefin or a copolymer of these olefins. Liquid polymers are preferred but solids of resins of low melting point may be utilized when properly dispersed in the required particle size to form a stable suspension.

A suspension of polyethylene in brine was formed by mixing 1 gram of molten polyethylene having a melting point of about 218° F., 60 ml. of 1 percent Igepal CO–990 in brine and 190 ml. of brine by stirring the three components for fifteen minutes on an Osterizer. Some of the polymer was not dispersed but floated on top of the mixture or coated mixture blades. However, the usually clear Igepal solution was cloudy which indicated a substantial amount of particulate polymer in suspension.

Another suspension was formed by mixing in an Osterizer 1 gram of polybutadiene having a molecular weight of about 5000 (a liquid), 60 ml. of 1 percent by weight of Igepal CO–990 in brine, and 190 ml. of brine. The mixture was blended for fifteen minutes after which time a portion of the polymer was found floating on the mixture but the mixture was cloudy which clearly indicated that a substantial amount of the polymer was in suspension in the brine.

Another suspension was prepared using the same ingredients and proportions as in the preceding paragraph but effecting the mixing in a colloid mill. The resulting suspension was even cloudier which indicated a higher concentration of the polymer in the brine solution of surfactant.

Another suspension of polyethylene was prepared using a sample of the same polyehylene (M.P. 218° F.) of the preceding suspension. The polyethylene was melted with Igepal CO–990 in the proportions of 4.0 polyethylene to 2.4 of the surfactant (by weight), at minimum melting temperature. The melt was allowed to cool, chopped up fine and dispersed in brine in a blender to give a final concentration of 0.4 weight percent polyethylene and 0.24 weight percent of the surfactant in the brine solution. Not all of the polyethylene dispersed but a substantial proportion did disperse in the brine solution and formed a very stable suspension on standing. Microscopic examination of the suspension after at least 24 hours of standing, showed a majority of the particles to be of a size of 1 micron and smaller.

A polyethylene suspension in Igepal CO–990 brine solution prepared as previously described to contain a final concentration of 0.4 percent by weight polyethylene and 0.24 percent by weight of the surfactant in the brine solution was used in a shake test with Nacatoch outcrop sand at 1.5, 2.0, and 3.0 pore volume. After 48 hours, the 1.5 pore volume suspension was still suspended. This is as good or better than a comparable suspension of carbon black in Igepal CO–990 made in accordance with the aforesaid patent.

The suspension prepared as in the preceding paragraph was stirred with Igepal CO–530 to give a final concentration of the oil-displacing surfactant of 0.24 weight percent. The resulting suspension containing both types of detergent was evaluated in a microslide test using the microslide apparatus described in the aforesaid patent in the paragraph in column 3, beginning at line 41 using Burbank oil sand containing Burbank oil. The test showed very active movement of the oil globules in the area thru which the suspension of polymer was driven and the sweep pattern was fairly complete. This test provided positive evidence of oil displacement.

A sample solution of Igepal CO–990 containing 30 weight percent of polyethylene particles was diluted with brine to give a 0.4 weight percent suspended solids concentration. A portion of the resulting sample was stirred with 0.24 weight percent of Igepal CO–530. Both suspensions were allowed to stand three days and were found to still be stable at the end of this time.

The selected polymers may be dispersed with suitable suspending agents such as Igepal CO–990 in any one of three ways. (1) The liquid polymer may be stirred directly with the surfactant solution. (2) The polymer, when a solid, may be melted and mixed with the surfactant solution in liquid state. (3) The polymer may be melted and mixed together with the surfactant in solid form and the cool mixture is then ground to a suitable particle size and dispersed in water or brine to form the suspension. Any method which reduces the polymer to the required particle size for forming the suspension may be utilized and is within the scope of the invention.

Certain modifications of the invention will become apparent to those skilled in the art and the illustrative details disclosed are not to be construed as imposing unnecessary limitations on the invention.

We claim:
1. A stable aqueous suspension of a polymer of a $C_2$ to $C_6$ olefin comprising:
   (a) water, as the major component;
   (b) a non-ionic surfactant in solution in the water in a concentration in the range of 0.001 to 5 wt. percent of said suspension, said surfactant being a polyethylene oxide ether or thioether having a maximum ethylene oxide chain length at the hydrophilic end of at least 30 moles and a single terminal hydroxyl group; and
   (c) at least one polymer of said $C_2$ to $C_6$ olefin of a particle size in the range of 0.001 to 2 microns suspended therein in a concentration in the range of .001 to 5 wt. percent of said suspension.

2. The suspension of claim 1 including from 0.001 to 5 wt. percent (based on the weight of the suspension) of an oil-displacing surfactant.

3. The suspension of claim 2 wherein said oil-displacing surfactant comprises essentially a polyethylene oxide ether or thioether having a maximum ethylene oxide chain length at the hydrophilic end in the range of 4 to 10 moles and a single terminal hydroxyl group.

4. The suspension of claim 1 wherein said polymer comprises essentially polyethylene.

5. The suspension of claim 1 wherein said polymer comprises essentially polypropylene.

6. The suspension of claim 1 wherein said polymer comprises essentially polybutadiene.

7. A process for producing oil from an oil stratum comprising the steps of:

(a) injecting into said stratum thru a well therein a slug of the suspension of claim 2;

(b) driving the slug of step (a) into said stratum away from said well so as to displace oil from the area of said stratum traversed by said slug; and (c) producing the oil displaced by step (b) from a well penetrating said stratum.

8. The process of claim 7 wherein the oil-displacing surfactant of said slug comprises essentially a polyethylene oxide ether or thioether having a maximum ethylene oxide to chain length at the hydrophilic end in the range of 4 to 10 moles and a single terminal hydroxyl group.

9. The process of claim 7 wherein the oil-displacing surfactant of said slug comprises essentially a polyethylene oxide ether or thioether having a maximum ethylene oxide chain length at the hydrophylic end in the range of 4 to 10 moles and a single terminal hydroxyl group and said polymer comprises essentially polyethylene.

10. The process of claim 7 wherein the oil-displacing surfactant of said slug comprises essentially a polyethylene oxide ether or thioether having a maximum ethylene oxide chain length at the hydrophilic end in the range of 4 to 10 moles and a single terminal hydroxyl group and said polymer comprises essentially polypropylene.

References Cited

UNITED STATES PATENTS

| | | | |
|---|---|---|---|
| 2,965,172 | 12/1960 | Da Roza | 166—42 |
| 3,046,222 | 7/1962 | Phonsalkar et al. | 166—42 X |
| 3,149,673 | 9/1964 | Pennington | 166—42 |
| 3,323,589 | 6/1967 | Harvey | 166—9 |
| 3,326,287 | 6/1967 | Corrin | 166—9 |
| 3,384,171 | 5/1968 | Parker | 166—9 |

STEPHEN J. NOVOSAD, *Primary Examiner.*

U.S. Cl. X.R

252—8.55